UNITED STATES PATENT OFFICE 2,114,636

COMPOSITION OF MATTER AND METHOD OF MANUFACTURING THE SAME

Charles S. Nelson, Niagara Falls, N. Y., assignor, by mesne assignments, to The Carborundum Company, Niagara Falls, N. Y., a corporation of Delaware No Drawing. Application March 11, 1935, Serial No. 10,459

12 Claims. (Cl. 51—278)

This invention relates to a new composition of matter and method of manufacturing the same. More specifically the invention is concerned with a new composition derived from rubber which is suitable for use as a cement, binder or adhesive and to a method of making the same.

In general the invention contemplates the incorporation with this new rubber composition of one or more hardening agents whereby there is formed a great variety of products of diverse properties. However a basic constituent of these compositions is a product formed by heating rubber under certain conditions whereby there is formed a rather viscous and somewhat sticky or tacky liquid which solidifies when heated with sulphur and which I have chosen to call "decomposed-rubber".

In preparing my decomposed-rubber I have found it convenient to employ an iron kettle with a loosely fitting cover into which I put pieces of crude rubber such as smoked sheet rubber cut into pieces about 2 inches square and the thickness of sheets as they are provided in commerce (about $\frac{3}{32}$″ thick).

Having charged the kettle with a quantity of the pieces of rubber I apply heat to the bottom of the kettle as, for example, by a gas flame. I continue to heat the kettle until the rubber starts to melt and slumps to the bottom whereupon I reduce the heat to a point so as to maintain a temperature of about 400–450° F. or thereabouts. I have not found that the temperature of the treatment is critical as the process is not especially sensitive to variations in temperature.

When a temperature of 400–450° F. is employed I maintain this temperature for about three hours more or less at which time I withdraw about ¾ of the liquid, leaving a sufficient quantity to wet additional pieces of rubber and effect a transfer of heat, and I then add a further quantity of the crude rubber pieces and continue heating. Additional liquid may be withdrawn and replaced by crude rubber periodically from then on at intervals determined by examination of the liquid. The frequency of withdrawal depends upon a number of factors including the proportion withdrawn, the temperature maintained, the size of the particles, the size and shape of the kettle and the size of charge employed.

The determination of the length of treatment is comparatively simple and can be readily made from observation and examination of the liquid, the properties of which are described in the following paragraph. When a schedule of temperatures and quantity of material added and withdrawn has once been worked out for a given piece of apparatus, results can be readily duplicated.

The product obtained by the treatment, which I call "decomposed-rubber" is a dark brown liquid of rather tacky or sticky consistency and having a viscosity of about 850 seconds Stormer at 204° F. It has a characteristic odor by which it may be readily identified. Its specific gravity is approximately .92 as compared to water. It is soluble in common rubber solvents such as benzol, gasoline and carbon tetrachloride but is insoluble in alcohol and acetone. It thins somewhat upon heating without apparent change in composition or properties even after heating to 300° F. for 16 hours.

Decomposed-rubber appears to react with sulphur when heated to 300° F. for about 16 hours in proportions up to about 1 part sulphur to 2 parts of decomposed-rubber. The reaction product of 1 part sulphur and 2 parts decomposed-rubber is a material having something of the properties, in bulk, of soft rubber but it has the unusual property of forming strong and stiff films on the surfaces of a mass of the reacted product which are jet black and glossy whereas the mass of the material is dull and greyish black in color. Lesser proportions of sulphur give products which are weaker and approach a liquid as the sulphur content approaches zero.

For example when a mixture of 2 parts decomposed-rubber and 1 part of sulphur is heated in a test tube a stick of the reacted product is formed which is rubbery in the interior but the outer surfaces of the stick are brittle. There does not appear to be any difference between the upper surface, which has been exposed to air, and the other surfaces which were in contact with the glass of the test tube.

These films appear to be very adhesive, even to glass, as it is practically impossible to remove a stick of the reacted product from a test tube and if the tube is broken the glass is found to be tightly stuck to the sides of the stick. It is believed that it is this unusual property of forming a hard tenacious film on the surface of a mass of the material which is responsible for its unusual properties as a cement or adhesive.

This decomposed-rubber has another unusual property which I have discovered which has considerably increased its value and the variety of products which can be prepared from it.

If decomposed-rubber and sulphur be mixed with certain resins such as various phenolic condensation products and certain vinyl resins, for example, a great variety of products can be made, the properties of which depend upon the kind and proportion of resin used as well as the proportions of each in the article. Where a relatively large proportion of decomposed-rubber with its proportion of sulphur (e. g. 1 part sulphur to 2 parts decomposed-rubber) is used, the product will be somewhat flexible but decidedly tougher and stronger, in mass, than the reacted decomposed-rubber alone. On the other hand, the addition of smaller proportions of decomposed-rubber and sulphur to a resin appears to increase the strength of the resin decidedly without appreciably affecting its rigidity.

I have found that mixtures of decomposed-rubber, sulphur and the ordinary "A stage" heat-hardenable phenol-formaldehyde resins form particularly valuable products although I have also successfully employed mixtures of decomposed-rubber and sulphur with a number of other resins including oil-modified phenolic resins, polymers of vinyl esters, and certain special vinyl resins formed by modifying vinyl ester polymers with certain aldehydes such as formaldehyde or acetaldehyde.

While these new compositions are adapted for a number of purposes I have found them to be particularly valuable in the manufacture of abrasive articles such as abrasive wheels and stones and abrasive coated products such as abrasive disks or abrasive paper and I will illustrate the use of the products by certain examples wherein the materials are employed as abrasive bonds.

Example I 885 grams of 100 grit fused alumina were mixed with 70 grams of decomposed-rubber, 35 grams of sulphur and 10 grams of magnesium oxide filler of a grade commonly employed in rubber compounding. The mixture, which was of a somewhat tacky consistency, was tamped into a mold and pressed at 3000 lbs. per sq. in. The formed article was then removed from the mold and cured by heating for 4 hours at 185° F., gradually raising the temperature to 325° F. over a period of about 10 hours, and continuing the heating at 325° F. for 13 hours. The article was cooled slowly, in about 8 hours, to room temperature.

Example II 875 grams of 16 grit fused alumina were mixed with 30 grams of decomposed-rubber. To the wetted grain there was then added a mixture of 15 grams of sulphur and 50 grams of pulverized shellac. Upon mixing the powder with the wet grain a dry, granular, readily distributable mix was formed which was levelled in a mold and pressed at 3000 lbs. per sq. in.

The shaped article was removed from the mold and heat treated and subsequently cooled as described in Example I.

Example III 900 parts of 16 grit fused alumina were mixed with 40 parts of decomposed-rubber and the wetted grains were then mixed with 20 parts of flowers of sulphur and 40 parts of a pulverized heat-hardenable phenolic condensation product in the so-called "A stage". Articles were pressed from the mix and cured as described in detail in Example II.

Example IV

The shellac of Example II was replaced by an equal quantity of a pulverized vinyl resin made by the copolymerization of vinyl chloride and vinyl acetate and sold under the trade-name "Vinyloid H".

Example V

A mixture was prepared consisting of 875 grams of 16 grit fused alumina abrasive grain, 30 grams of decomposed-rubber, 15 grams of sulphur, 30 grams of pulverized flint and 50 grams of a pulverized heat-hardenable phenolic resin in the so-called "A stage". An article was pressed from this mixture at 3000 lbs. per sq. in. and heat treated as described in Example I.

Example VI

A cut-off wheel 12 inches in diameter and $\frac{3}{32}$ of an inch thick was made from a mixture consisting of 810 parts of 50 grit silicon carbide, 40 parts of decomposed-rubber, 20 parts of sulphur, and 80 parts of a pulverized heat-hardenable phenolic resin in the "A stage".

Example VII

Abrasive paper was prepared by spreading onto a backing a layer of decomposed-rubber cut with benzol, dusting onto the coated surface a mixture of abrasive grains, pulverized resin and sulphur and heating until the binder had solidified.

As previously stated the method of making decomposed rubber is not particularly sensitive to variations in time and temperature of treatment but I have found in general that the quicker the liquid is removed from the kettle the greater the strength of the articles that are obtained. Furthermore I have found it desirable to allow the low boiling constituents which appear to form during the early stages of the process to escape. For example I prepared a liquid from rubber by refluxing a mass of crude rubber for 3 hours. When this liquid was substituted for my decomposed-rubber in a mixture consisting of 875 parts of abrasive grains, 30 parts of the refluxed liquid, 15 parts of sulphur, 50 parts of phenolic resin and 30 parts of pulverized flint, the cured article had a tensile strength of 1210 pounds per square inch as compared to 1830 pounds per square inch where decomposed-rubber was used in the same mix.

I also determined the effect of continued heat treatment by heating a quantity of decomposed-rubber at 435° F. for 21 hours, withdrawing a portion of liquid every three hours, and making mixes of the composition just described but substituting the various samples of liquid for the decomposed-rubber. I found that the strength of the mixes decreased rather slowly for treatments up to 6 hours additional heating of the decomposed-rubber, the strength of such articles being 1770 pounds per square inch against 1830 for the decomposed-rubber itself. However upon continued heating the strengths fell off more rapidly being but 800 pounds per square inch in the material that had been heated 21 hours.

My decomposed-rubber is also to be distinguished from those materials described in the literature as being obtained by the dry distillation of rubber. I prepared liquids by distilling at temperatures up to 565° F. and found that these distillates, when substituted in the formula given above, made articles having a tensile strength of but 565 pounds per square inch.

Although I have illustrated my invention with certain specific examples in which decomposed-rubber was used as a binder for abrasive grains, my new product may be used for many other purposes as, for example, in cementing ceramic, metal, rubber and other articles, as a binder for granular products in the manufacture of roofing paper, as a binder for the usual fillers such as wood flour or asbestos in the manufacture of molded articles and for many other purposes for which binders, cements, or adhesives are employed.

Furthermore while I have described the invention in connection with compounds comprising phenolic resins and sulphur, other hardening agents may be employed to rigidify, strengthen or otherwise alter the properties of decomposed-rubber. My invention is therefore not to be limited by the specific disclosures made but rather is to be interpreted as defined in the appended claims.

I claim:

1. As a new article of manufacture, an abrasive article comprising abrasive grains and a bond therefor comprising a hardened rubber derivative which was rendered irreversibly liquid by heat alone prior to hardening.

2. As a new article of manufacture, an abrasive article comprising abrasive grains and a bond therefor comprising the product resulting from a heat treatment of a hardenable rubber derivative rendered irreversibly liquid by heat alone, sulphur and resinous material.

3. As a new article of manufacture, an abrasive article comprising abrasive grains and a bond therefor comprising the product resulting from a heat treatment of a hardenable rubber derivative rendered irreversibly liquid by heat alone, sulphur and a phenolic condensation product resin.

4. A heat-hardenable composition comprising a hardenable rubber derivative rendered irreversibly liquid by heat alone, sulphur and a resinous material.

5. A heat-hardenable composition comprising a hardenable rubber derivative rendered irreversibly liquid by heat alone, sulphur, a resinous material and granular material.

6. A heat-hardenable composition comprising a hardenable rubber derivative rendered irreversibly liquid by heat alone, sulphur, a resinous material and abrasive grains.

7. The method of making a heat-hardenable composition which comprises heating a mass of unvulcanized rubber at temperatures not substantially outside the range of 400–450° Fahrenheit to irreversibly liquefy it by heat alone and commingling the liquid with sulphur and a resinous material.

8. The method of making a heat-hardenable composition which comprises heating a mass of unvulcanized rubber at temperatures not substantially outside the range of 400–450° Fahrenheit to irreversibly liquefy it by heat alone and commingling the liquid with sulphur, a resinous material and granular material.

9. The method of making a heat-hardenable composition which comprises heating a mass of unvulcanized rubber at temperatures not substantially outside the range of 400–450° Fahrenheit to irreversibly liquefy it by heat alone and commingling the liquid with sulphur, a resinous material and abrasive grains.

10. The method of making an article of bonded granular material which comprises heating unvulcanized rubber to render it irreversibly liquid by the action of heat alone, mixing the liquid rubber with granular material and a hardening agent, forming the mixture into an article, and heating the article to harden it.

11. The method of making an article of bonded granular material which comprises heating unvulcanized rubber to render it irreversibly liquid by the action of the heat alone, mixing the liquefied rubber with granular material, sulphur and a resinous material, forming an article from the mixture, and heating the article to harden it.

12. The method of making abrasive articles which comprises heating unvulcanized rubber to render it irreversibly liquid by the action of the heat alone, mixing the liquid rubber with abrasive grain and a hardening agent, forming the mixture into an article, and heating the article to harden it.

CHARLES S. NELSON.